(12) United States Patent
Shiao

(10) Patent No.: US 6,366,073 B1
(45) Date of Patent: Apr. 2, 2002

(54) NAIL LOCATING DEVICE WITH PIVOTABLE MAGNET SUPPORTING INDICATOR ROD

(76) Inventor: Hsuan-Sen Shiao, No. 15-1, Lane 369, Min-Chuan Rd., Taichung City (TW)

(*) Notice: Subject to any disclaimer, the term of this patent is extended or adjusted under 35 U.S.C. 154(b) by 0 days.

(21) Appl. No.: 09/564,468

(22) Filed: May 3, 2000

(51) Int. Cl.[7] ................................................ G01R 33/00
(52) U.S. Cl. ....................................................... 324/67
(58) Field of Search .......................... 324/67, 228, 259, 324/326, 345; 116/204; 273/141 A

(56) References Cited

U.S. PATENT DOCUMENTS 6,087,824 A * 7/2000 Shiao ........................... 324/67

* cited by examiner

Primary Examiner—Jay Patidar
Assistant Examiner—Reena Aurora
(74) Attorney, Agent, or Firm—Foley & Lardner

(57) ABSTRACT

A nail locating device is adapted for locating a magnetically attractive nail that was driven into a non-magnetically attractive board, and includes a seat, an indicator rod and a biasing spring. The seat is adapted to be moved on a surface of the board, and confines a vertically extending receiving space therein. The indicator rod is disposed in the receiving space, and has a ball portion and a magnet supporting portion that extends downwardly from the ball portion. The magnet supporting portion has a magnet member mounted thereto. The biasing spring is disposed in the receiving space, and supports the ball portion of the indicator rod in the receiving space such that the indicator rod is pivotable in the seat and is movable downwardly in the receiving space due to attraction of the magnet member to the nail in order to indicate the location of the nail in the board.

13 Claims, 5 Drawing Sheets

NAIL LOCATING DEVICE WITH PIVOTABLE MAGNET SUPPORTING INDICATOR ROD

BACKGROUND OF THE INVENTION

1. Field of the Invention

The invention relates to a nail locating device with a pivotable magnet supporting indicator rod to permit location of a magnetically attractive nail on a non-magnetically attractive board in a fast and convenient manner.

2. Description of the Related Art

A nail locating device is used for locating a nail that was driven into a board when removing the nail from the latter. Boards used for decorating a building interior or a room place are sometimes covered with wallpaper or coated with paint such that the nails driven into the same cannot be found easily. When the boards are to be dismantled, the nails driven thereinto should be removed, and a nail locating device is thus required.

A conventional nail locating device for locating a magnetically attractive nail that was driven into a non-magnetically attractive board generally includes a transparent casing made of plastic and provided with a pivot shaft, and an indicator rod disposed within the casing and having an upper end pivoted to the pivot shaft about a pivot axis. The indicator rod has a bottom end provided with a magnet. The casing has front and rear sides provided with aligned marks that are aligned vertically with the pivot shaft.

When the conventional nail locating device is used to locate an iron nail that was driven into a wooden board, the casing is moved on a surface of the board so that the indicator rod pivots in the casing in the direction of the nail due to attraction of the magnet to the nail. The casing is moved by the operator until the indicator rod is generally perpendicular to the wooden board, indicating that the nail is located on a line that passes through the aligned marks. A first indicating line along the aligned marks is then drawn on the board by the operator. Thereafter, the casing is once again moved on the surface of the board, and the aforementioned procedure is repeated until a second indicating line is obtained. The first and second indicating lines intersect at a point, which is the location of the nail.

Although the conventional nail locating device achieves the purpose of locating a magnetically attractive nail, such as an iron nail, on a non-magnetically attractive board, such as a wooden board, it suffers from the following drawback: Two line drawing operations must be performed so as to draw two intersecting indicating lines before the nail can be located, thereby resulting in a relatively inconvenient and time-consuming locating operation.

In co-pending U.S. patent application Ser. No. 09/048, 892, filed by the applicant on Mar. 27, 1998, there is disclosed a nail locating device with a magnet supporting indicator rod mounted in a ball socket. The nail locating device includes a seat adapted to be moved on a surface of a non-magnetically attractive board and having open upper and lower end portions, and an intermediate portion between the upper and lower end portions and formed with the ball socket therein. A coupling member has a ball portion hinged to the seat in the ball socket. The indicator rod is received in the seat, and extends from the upper end portion, through the ball portion of the coupling member, and into the lower end portion of the seat. The indicator rod has a bottom end provided with a magnet that is adapted to be attracted to a magnetically attractive nail that was driven into the board such that the indicator rod pivots in the seat due to attraction of the magnet to the nail in order to indicate the location of the nail in the board.

The coupling member further includes a tubular sleeve portion extending downwardly from the ball portion and sleeved on the indicating rod. The bottom end of the indicator rod has the head portion of a pressing nail mounted thereon below the magnet. The pressing nail further has a tip that projects downwardly and outwardly of the sleeve portion. The indicator rod has a top end which projects outwardly and upwardly of the upper end portion of the seat to permit pressing of the indicator rod so that the pressing nail can make a mark after the nail is located. The sleeve portion has a bottom end formed with a plurality of spring leaves that extend radially and inwardly therefrom and that have upturned distal ends abutting against the head portion of the pressing nail for biasing the indicator rod upwardly.

Some of the drawbacks of the nail locating device disclosed in the aforesaid co-pending U.S. patent application are as follows:

1. A separate component, i.e. the coupling member, is required to mount the indicator rod in the seat.

2. The seat has an annular surrounding wall that is provided with at least one axial slit so as to impart resilience thereto in order to permit forcing of the ball portion of the coupling member into the ball socket via the upper end portion of the seat. In addition, the spring leaves are formed at the bottom end of the sleeve portion of the coupling member. The components of the nail locating device are difficult to form, thereby resulting in higher production costs.

3. While the pressing nail can be used to make a mark after a nail is located, it is noted that the mark is not clearly visible when the nail is made of a relatively hard material.

SUMMARY OF THE INVENTION

Therefore, the main object of the present invention is to provide a nail locating device with a pivotable magnet supporting indicator rod to permit location of a magnetically attractive nail on a non-magnetically attractive board in a fast and convenient manner.

Another object of the present invention is to provide a nail locating device of the aforesaid type having components that are relatively easy to manufacture and assemble, and that facilitate making of a visible indication when the location of a nail driven into a board is found.

According to the present invention, a nail locating device is adapted for locating a magnetically attractive nail that was driven into a non-magnetically attractive board, and comprises a seat, an indicator rod, and a biasing spring.

The seat is adapted to be moved on a surface of the board, and confines a vertically extending receiving space therein.

The indicator rod is disposed in the receiving space, and has a ball portion and a magnet supporting portion that extends downwardly from the ball portion. The magnet supporting portion has a magnet member mounted thereto.

The biasing spring is disposed in the receiving space, and supports the ball portion of the indicator rod in the receiving space such that the indicator rod is pivotable in the seat and is movable downwardly in the receiving space due to attraction of the magnet member to the nail in order to indicate the location of the nail in the board.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
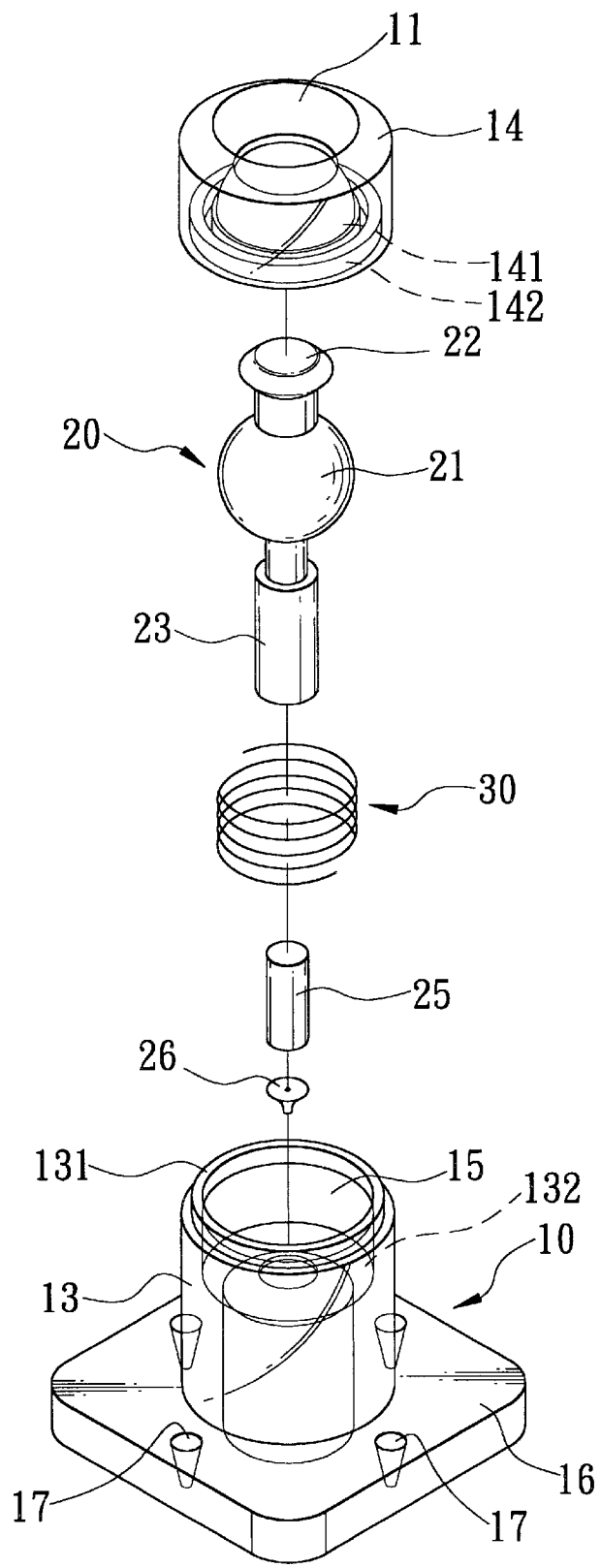
FIG. 1 is an exploded perspective view showing the first preferred embodiment of a nail locating device according to this invention.
Figure 2:
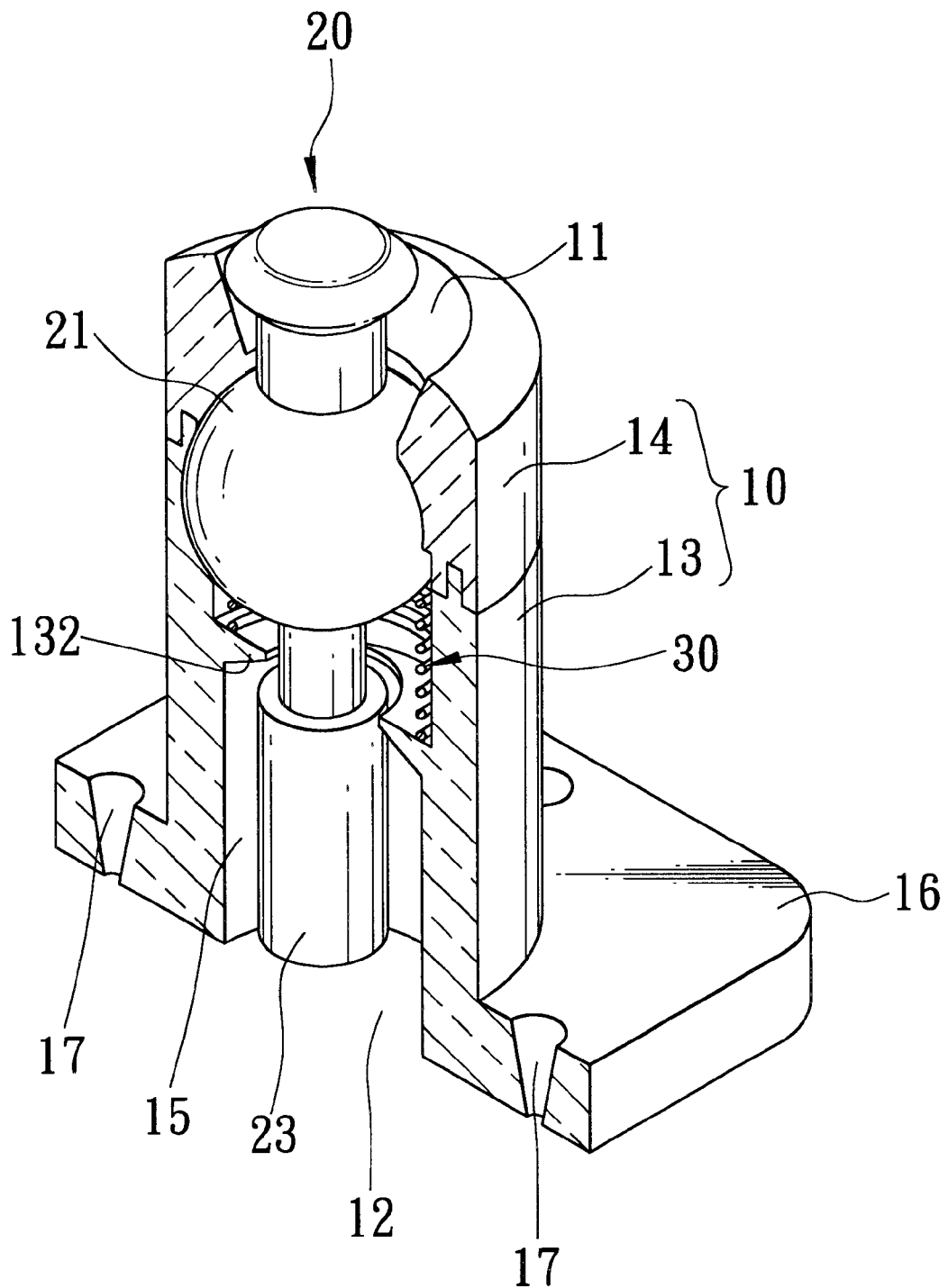
FIG. 2 is an assembled perspective view of the first preferred embodiment, with a seat thereof illustrated in cross-section.
Figure 3:
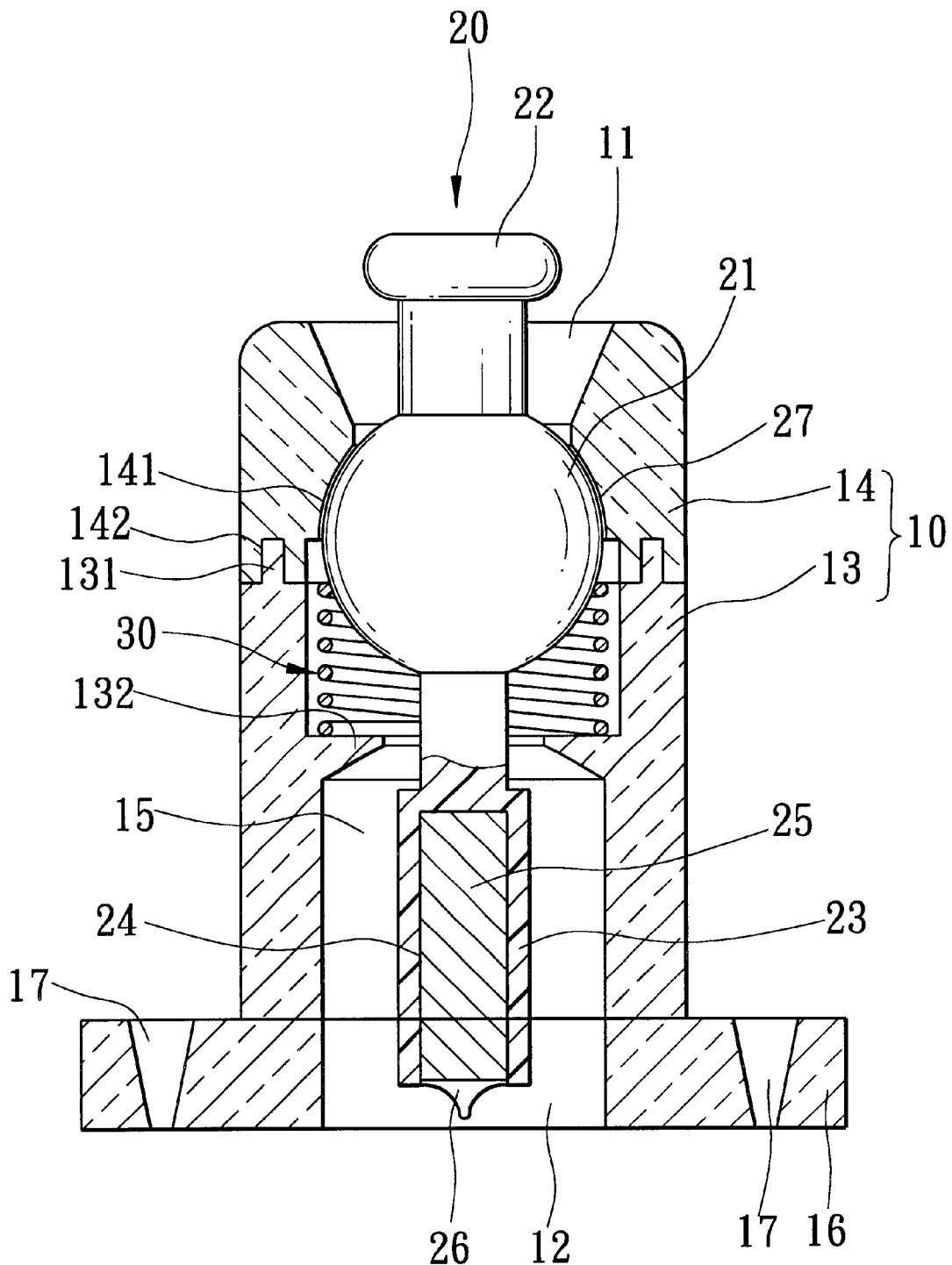
FIG. 3 is a vertical sectional view of the first preferred embodiment.

Referring to FIGS. 1, 2 and 3, the first preferred embodiment of a nail locating device according to the present invention is shown to comprise a seat 10, an indicator rod 20 and a biasing spring 30.

The seat 10, which is made of a transparent material, confines a vertically extending receiving space 15, and has open upper and lower ends 11, 12. In this embodiment, the seat 10 includes an upright tubular member 13 and an upper cover 14. The tubular member 13 has a top end formed with an upwardly extending rim projection 131, an intermediate section formed with an inwardly and radially extending abutment flange 132, and a bottom end formed with an outwardly and radially extending base flange 16. In this embodiment, the base flange 16 is a rectangular flange formed with two pairs of marking portions 17. The pairs of marking portions 17 are disposed on two orthogonal lines, respectively. Each marking portion 17 is formed as a hole that tapers downwardly. The upper cover 14 is formed with a radial inward annular limit projection 141 with a concave bottom surface. The upper cover 14 further has a bottom end formed with a downwardly opening rim groove 142 for fitting engagement with the rim projection 131 on the top end of the tubular member 13, thereby mounting the upper cover 14 on the tubular member 13.

The indicator rod 20 is disposed in the receiving space 15, and has a ball portion 21, a depressing portion 22 that extends upwardly from the ball portion 21, and a tubular magnet supporting portion 23 that extends downwardly from the ball portion 21. The magnet supporting portion 23 confines a blind hole 24 for mounting a permanent magnet member 25 fixedly therein. A marking element, in the form of a pressing nail 26, made of a metal material of high hardness, has a head portion that is coupled to a bottom end of the magnet supporting portion 23, and a tip portion that projects downwardly from the head portion. The ball portion 21 is disposed between the abutment flange 132 and the annular limit projection 141. The annular limit projection 141 prevents removal of the indicator rod 20 from the tubular member 13 when the upper cover 14 is secured on the latter.

In this embodiment, the biasing spring 30 is a coiled compression spring that is disposed in the receiving space 15. The biasing spring 30, which has a coil diameter smaller than a diameter of the ball portion 21, is disposed around the indicator rod 20, and has an upper end abutting against the ball portion 21, and a lower end seated on the abutment flange 132. The biasing spring 30 biases the ball portion 21 toward the concave bottom surface of the annular limit projection 141 such that the tip portion of the pressing nail 26 is normally disposed in a retracted position relative to the open lower end 12 of the seat 10, and supports the ball portion 21 in the receiving space 15 such that the indicator rod 20 is pivotable in the seat 10 and is movable vertically in the receiving space 15. Preferably, the concave bottom surface of the annular limit projection 141 has a degree of curvature that is slightly larger than the curvature of the ball portion 21, thereby forming a small clearance 27 between the annular limit projection 141 and the ball portion 21 to minimize resistance to pivoting movement of the indicator rod 20 in the seat 10. In addition, since the main purpose of the biasing spring 30 is to provide a restoring force to the indicator rod 20, the spring coefficient of the biasing spring 30 is chosen to be as small as possible to prevent the biasing spring 30 from affecting adversely pivoting movement of the indicator rod 20 in the seat 10.

During assembly, the biasing spring 30 is initially placed inside the receiving space 15 from the top end of the tubular member 13. Then, with the magnet member 25 and the pressing nail 26 provided on the indicator rod 20, the indicator rod 20 is placed inside the receiving space 15 from the top end of the tubular member 13 such that the magnet supporting portion 23 extends through the biasing spring 30. At this time, the ball portion 21 is seated on the upper end of the biasing spring 30. Finally, the upper cover 14 is sleeved on the depressing portion 22 of the indicator rod 20, and is secured on the top end of the tubular member 13 by virtue of the press-fitting engagement between the rim groove 142 and the rim projection 131.

Figure 4:
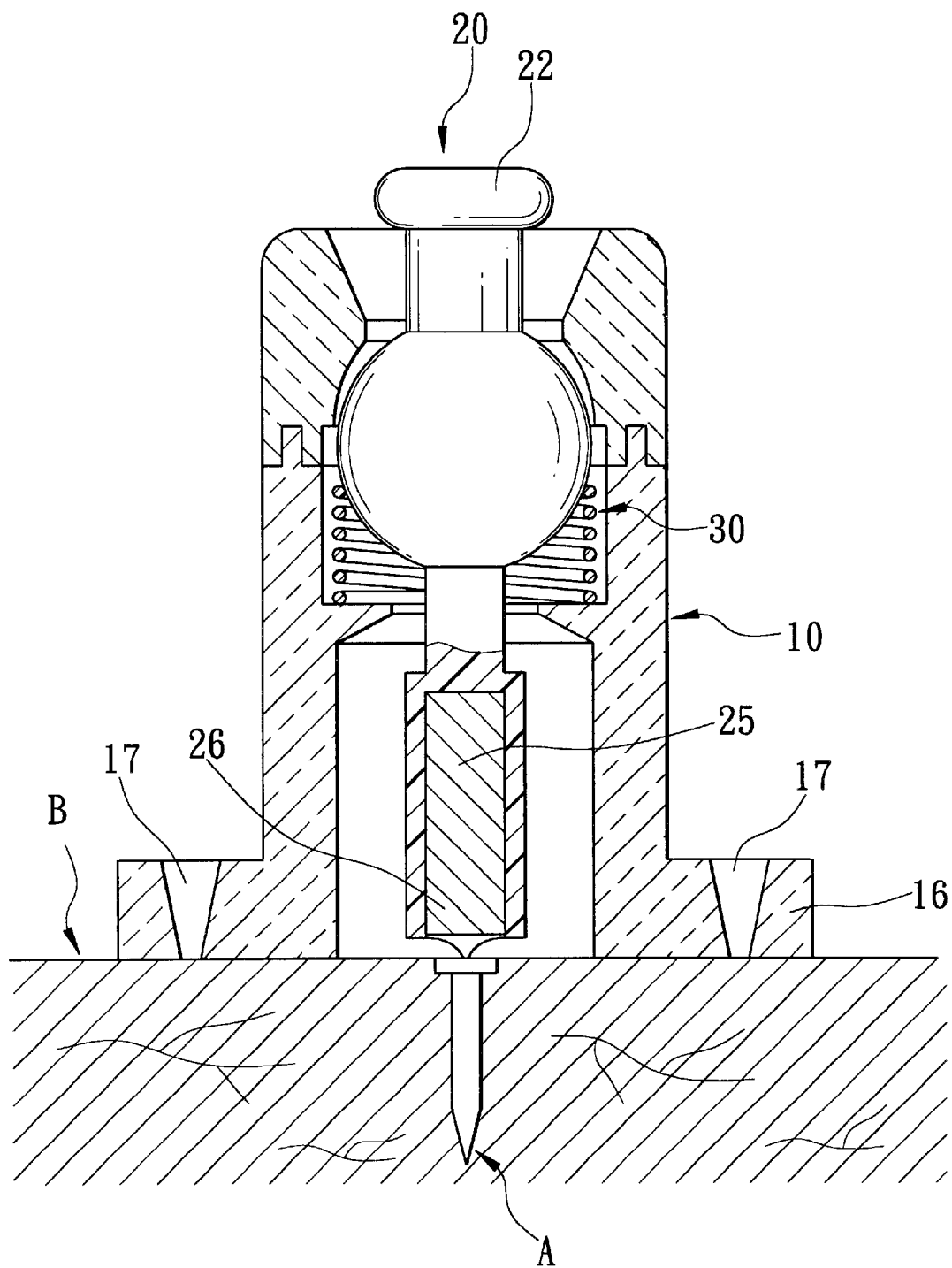
FIG. 4 is another vertical sectional view illustrating the first preferred embodiment in a state of use.

With further reference to FIG. 4, when the nail locating device of the preferred embodiment is used to locate a magnetically attractive nail (A) that was driven into a non-magnetically attractive board (B), the seat 10 is moved on a surface of the board (B) so that the indicator rod 20 pivots in the seat 10 due to attraction of the magnet member 25 to the nail (A). The seat 10 is moved by the operator until the indicator rod 20 is generally perpendicular to the surface of the board (B), indicating that the nail (A) is located directly below the indicator rod 20. At this time, the indicator rod 20 moves downwardly in the receiving space 15 to compress the biasing spring 30 due to attraction of the magnet member 25 to the nail (A). The downward movement of the indicator rod 20 provides a noticeable indication of the location of the nail (A). Thereafter, the depressing portion 22 of the indicator rod 20, which extends outwardly of the seat 10 via the open upper end 11, can be pressed downwardly by the operator, with the use of his finger, so that the ball portion 21 further compresses the biasing spring 30 and so that the magnet supporting portion 23 moves the pressing nail 26 toward the open lower end 12 of the seat 10 to enable the pressing nail 26 to make a mark for indicating the location of the nail (A). After marking, the seat 10 is moved away from the nail (A), and the pressing force on the indicator rod 20 is released. The biasing spring 30 expands to restore the indicator rod 20 to an initial position, as shown in FIG. 3.

In case the nail (A) is made of a relatively hard material such that the mark made with the use of the pressing nail 26 is not clearly visible, four points can be drawn on the surface of the board (B) with the use of the marking portions 17 on the base flange 16 after the location of the nail (A) is found. After drawing the points, the seat 10 is moved away from the nail (A), and two orthogonal lines are drawn on the surface of the board (B) by interconnecting diagonally opposite pairs of the points. The intersection of the orthogonal lines is the location of the nail (A) that was driven into the board (B).

Figure 5:
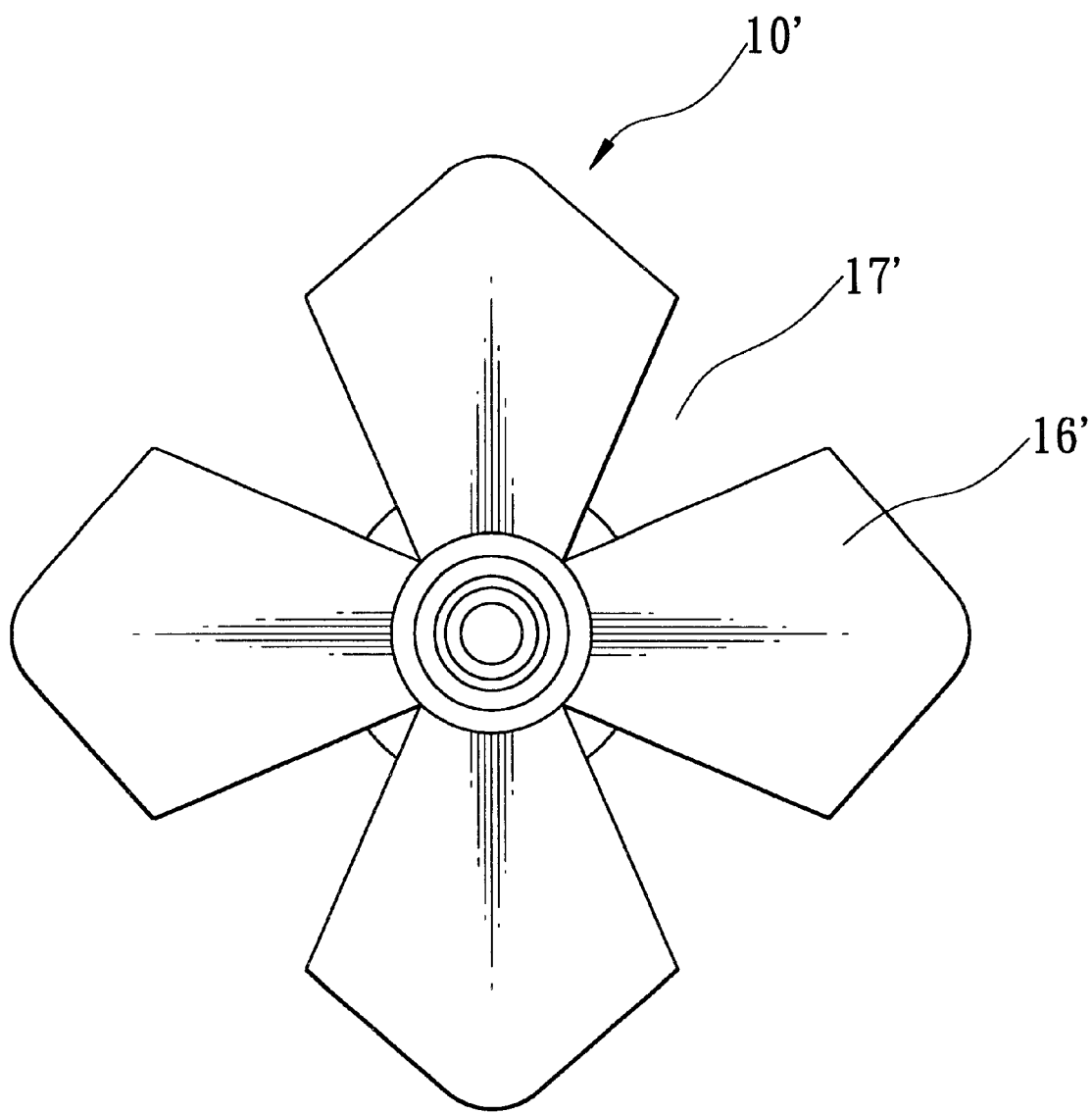
FIG. 5 is a bottom view of a seat of the second preferred embodiment of a nail locating device according to this invention.

FIG. 5 illustrates a seat 10' of the second preferred embodiment of a nail locating device according to the present invention. Unlike the first preferred embodiment, the marking portions 17' on the base flange 16' are in the form of V-shaped notches that converge in a radial inward direction.

Some of the advantages arising from the use of the nail locating device of this invention are as follows:

1. Since the ball portion 21 is formed on the indicator rod 20, the indicator rod 20 can be mounted pivotally in the seat 10 without the need for a separate component, such as the coupling member employed in the aforesaid co-pending U.S. patent application.

2. Because the seat 10 is formed from the tubular member 13 and the upper cover 14, the indicator rod 20 and the biasing spring 30 can be mounted easily and conveniently in the receiving space 15 of the seat 10. In addition, the tubular member 13 and the upper cover 14 have relatively simple configurations, thereby facilitating formation of the same to result in lower production costs.

3. In case the mark made with the use of the pressing nail 26 is not clearly visible, the presence of the marking portions 17, 17' on the seat 10, 10' permits the drawing of orthogonal lines that intersect at a point which corresponds to the location of the nail (A) that was driven into the board (B).

It should be noted that the pressing nail 26 is not essential to the operation of the nail locating device of this invention. Without the pressing nail 26, the location of the nail (A) that was driven into the board (B) can still be found, and marking of the location of the nail (A) can be made with the use of the marking portions 17, 17' on the seat 10.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A nail locating device for locating a magnetically attractive nail that was driven into a non-magnetically attractive board, said nail locating device comprising:

a seat adapted to be moved on a surface of the board and confining a vertically extending receiving space therein;

an indicator rod disposed in said receiving space, and having a ball portion and a magnet supporting portion that extends downwardly from said ball portion, said magnet supporting portion having a magnet member mounted thereto; and a biasing spring disposed in said receiving space and supporting said ball portion of said indicator rod in said receiving space such that said indicator rod is pivotable in said seat and is movable downwardly in said receiving space due to attraction of said magnet member to the nail in order to indicate the location of the nail in the board.

2. The nail locating device of claim 1, wherein said seat has open upper and lower ends, and an inwardly and radially extending abutment flange disposed between said open upper and lower ends, said biasing spring being a coiled compression spring having a coil diameter smaller that a diameter of said ball portion of said indicator rod, said biasing spring being disposed around said indicator rod, and having a lower end that is seated on said abutment flange, and an upper end that abuts against said ball portion.

3. The nail locating device of claim 2, wherein said seat further has a radial inward annular limit projection that is disposed above said ball portion of said indicator rod, said biasing spring biasing said ball portion toward said annular limit projection, said annular limit projection preventing removal of said indicator rod from said seat via said open upper end.

4. The nail locating device of claim 3, wherein said annular limit projection has a concave bottom surface that confronts said ball portion of said indicator rod.

5. The nail locating device of claim 4, wherein said concave bottom surface of said annular limit projection has a degree of curvature that is slightly larger than curvature of said ball portion of said indicator rod.

6. The nail locating device of claim 3, wherein said seat includes an upright tubular member formed with said abutment flange, and an upper cover mounted on said tubular member and formed with said annular limit projection.

7. The nail locating device of claim 2, wherein:

said magnet supporting portion has a bottom end provided with a marking element below said magnet member;

said biasing spring biasing said indicator rod upwardly such that said marking element is normally disposed in a retracted position relative to said open lower end of said seat;

said indicator rod further having a depressing portion that extends upwardly from said ball portion and that extends outwardly of said seat via said open upper end;

whereby, application of a pressing force on said depressing portion enables said ball portion to compress said biasing spring and further enables said magnet supporting portion to move said marking element toward said open lower end of said seat so that said marking element can make a mark on the board after the nail is located.

8. The nail locating device of claim 7, wherein said marking element is a pressing nail having a head portion that is disposed at said bottom end of said magnet supporting portion, and a tip portion that projects downwardly from said head portion.

9. The nail locating device of claim 7, wherein said magnet supporting portion is a tubular portion that confines a blind hole for mounting said magnet member therein.

10. The nail locating device of claim 1, wherein said seat has a bottom end formed with an outwardly and radially extending base flange, said base flange being formed with two pairs of marking portions, said pairs of marking portions being disposed on two orthogonal lines, respectively.

11. The nail locating device of claim 10, wherein each of said marking portions is formed as a hole that tapers downwardly.

12. The nail locating device of claim 10, wherein each of said marking portions is formed as a V-shaped notch that converges in a radial inward direction.

13. The nail locating device of claim 1, wherein said seat is made of a transparent material.

* * * * *